Patented Dec. 6, 1938

2,139,340

UNITED STATES PATENT OFFICE 2,139,340

TOBACCO INSECTICIDE AND METHOD OF MAKING SAME

William Hunter Volck, Watsonville, Calif., assignor to California Spray-Chemical Corporation, Berkeley, Calif., a corporation of Delaware No Drawing. Application June 24, 1935, Serial No. 28,144

7 Claims. (Cl. 167—34)

This invention relates to improvements in the preparation and composition of insecticides and more particularly to insecticides in which a fine tobacco powder is impregnated and/or coated with materials which, either by chemical action or by their physical nature or both, materially enhance its insecticidal value.

During recent years agitation against the application of lead, asenic and fluorine containing insecticides to vegetables and fruit which are for human consumption has been so widespread as to bring about a rapidly expanding search for less toxic materials or at least for materials whose effect on the animal organism is not cumulative and which will still afford adequate protection of such foodstuffs against the ravages of predatory insects. Encouraging results in this direction have been realized through the more general utilization of certain extracts from pyrethrum, derris, cube and tephrosia. These extracts are, however, of limited application and can by no means take the place of the objectionable inorganic insecticides which are primarily stomach rather than contact poisons. For this reason very considerable attention has been directed to nicotine and its various compounds which are apparently both contact and stomach poisons for insects but which while toxic to humans have no known cumulative effects.

A very large part of the total lead and calcium arsenate utilized by the insecticide industry in the treatment of edible crops has been directed to the control of the codling moth on apples and pears. Control of this extremely destructive and hence important insect is therefore one of the first requisites of a substitute for the arsenicals.

Nicotine was undoubtedly first used as an insecticide in situ in the dried and ground tobacco plant in which it originates. Due to the low effectiveness of such tobacco preparations and the difficulties encountered in applying the same the insecticide industry next turned to the considerably more expensive free alkaloid and its several better known salts. While various such preparations have in certain instances met with moderate success as insecticides and at high concentrations applied at very frequent intervals might be expected to control even the codling moth, all such materials are so expensive as to be generally considered uneconomical for this purpose. Due to its particular life cycle and characteristic habits this insect can only be controlled by insecticides whose effects may be retained substantially uninterrupted throughout the growing season. Even lead arsenate-oil compositions which may be classed with the more permanent and durable insecticides must be applied from three to as many as fifteen times during a crop season to effect satisfactory control of this pest. Little wonder therefore that such relatively transient agents as the volatile and/or water-soluble nicotine preparations hitherto known, which are at the same time much more costly than arsenate-oil sprays, have shown little economic value in the battle against the codling moth.

It is the object of this invention to provide insecticides which derive their insecticidal value from a nicotine component, which are of high potency and which retain their effectiveness over a period of time which is comparable to the effective life of lead arsenate-oil sprays under similar conditions of use.

Certain nicotine compounds which possess superior characteristics as insecticides have been found to result from the interaction of nicotine or its common salts such as the sulfate with the petroleum sulfonic acids or their alkali salts. As a group, they are highly water-soluble, oil-insoluble, non-volatile, air and light-stable, non-phytocidal and highly insecticidal.

The basis of the present invention resides in my discovery that very fine tobacco powders when properly treated with the alkali salts of petroleum sulfonic acids and otherwise properly modified and/or augmented result in insecticides which are in every respect the equal of or superior to any hitherto known nicotine preparations. They are substantially equal to lead arsenate-oil in effectiveness, in durability, in ease of application and in economy and hence constitute a practical substitute for such dangerous arsenical poisons in the control of codling moth and other insects on edible crops.

My tobacco-sulfonic salt compositions are readily compatible with the petroleum oil insecticides and hence also find utility in the control of aphids, red spider, San Jose scale, leaf hoppers, bud mite, and many other of the well known agricultural pests.

In preparing a tobacco powder or dust insecticide according to the present invention tobacco is ground, or when necessary dried and ground, to a very fine powder, usually about 200 mesh and preferably even finer. As is well known tobaccos are quite variable in their nicotine content the extremes being from a fraction of 1% to as high as 12% or more. When the tobacco available contains less than about 2.0–4.0% by weight of nicotine alkaloid I have found it desirable to add free nicotine or nicotine salt in proper form to bring the concentration to about this range. The fine powder is then treated with a petroleum sulfonic salt, together with such additional agents as may be desired, in a manner to produce a thin, uniform coating on the individual particles. This coating may be so thin and so uniform as to leave the powder as a whole but slightly moist and hence still free flowing and suitable for "dust" application though it will usually be found desirable to apply it as an aqueous suspension.

It is usually most convenient in this preparation to apply the sulfonic salt and other materials in liquid form by spraying or atomizing the same slowly into the tobacco powder while the latter is undergoing thorough agitation or mixing the operation being conducted with care to prevent balling of the tobacco.

In addition to providing for reaction with the nicotine of the tobacco and any further quantity of the same material which may have been added the sulfonic salt also serves as a highly efficient wetting and spreading agent for the powder when it is applied as an aqueous suspension and alone or together with a small amount of petroleum oil appears ultimately to act as an adhesive or sticker for the powder when applied either as a dust or a suspension. Other wetting agents which are effective in a weakly acid medium such, for example, as the sulfated higher aliphatic alcohols or their salts may in some instances be employed together with the petroleum sulfonic salts to good advantage.

While in many instances the tobacco-sulfonate or tobacco-sulfonate-oil compositions just described will be found to be entirely satisfactory alone, small quantities of other materials may be incorporated for certain specific effects. For instance a few percent of an organic solvent such as ethyl or isopropyl alcohol may be added to aid the sulfonate to penetrate the tobacco particles. The specific wetting, spreading and flocculating powder of the sulfonate may be modified through the incorporation of small amounts of the correct metal constituents as for instance zinc or calcium.

I have found that both the oil soluble petroleum sulfonic salts such as those formed during the exhausting refining of petroleum distillates with strong or fuming sulfuric acid in the production of medicinal oils and extractable from the oil by solvents such as aqueous alcohol and the water soluble sulfonic salts recoverable from the strong acid sludges act quite similarly in my compositions so far as the effect on the nicotine constituent is concerned. However, since the sticking effect which may be obtained through the addition of a small amount of oil to the tobacco powder is much to be desired it will usually be found convenient to employ the oil soluble sulfonates in order that they may be applied in solution in the oil in a single operation. Sulfonates of this general type have been described in Petroff #1,087,888, 1,196,274, 1,233,700 and by others in numerous subsequent United States patents.

One feature which has been found uniformly desirable in maintaining my preparations active for relatively very long periods of time lies in the fact that a small amount of free acid is incorporated therein. While the acidification of nicotine bearing insecticides is directly contrary to the prevailing idea that to be effective nicotine must be liberated through the provision of an alkaline medium or carrier, I have nevertheless found the tobacco-sulfonic salt compositions herein described to be equally effective and far more lasting in their effect when maintained in a weakly acid condition. For this purpose I have found it convenient to use an acid which is both oil and water soluble to a degree such as glacial acetic or phosphoric though other acids would undoubtedly serve the same purpose.

In order to indicate more clearly the nature of my compositions and a convenient method for their preparation the following several examples are given:

Example 1

| | Parts by weight |
|---|---|
| Nicotine sulfate solution (40% alkaloid) | 125 |
| Glacial acetic acid | 50 |
| Isopropyl alcohol | 325 |
| Oil soluble sulfonates (neutralized) | 70 |
| Petroleum oil #5 (100–110 Saybolt vis. @ 100° F.) | 430 |
| Tobacco powder (200 mesh, approx. 1% nicotine) | 3000 |

The nicotine sulfate solution, acetic acid and alcohol are mixed together and thoroughly worked into the tobacco powder until uniformly moistened. The sulfonate dissolved in the oil is then atomized into the powder and worked until uniform. The ultimate composition of the product would therefore be:

| | Percent |
|---|---|
| Nicotine alkaloid (exclusive of that in tobacco) | 1.28 |
| Water | 1.92 |
| Acetic acid | 1.20 |
| Isopropanol | 8.10 |
| Sulfonic salt | 1.67 |
| Oil | 10.83 |
| Tobacco | 75.00 |

Example 2

The same as No. 1 except that 150 parts by weight of hard wall plaster (substantially calcium sulfate) is added to the tobacco powder before adding the liquids.

Example 3

The same as No. 1 except that the acetic acid is increased to 100 parts, the alcohol is reduced to 275 parts and 50 parts of zinc oxide is added to the tobacco powder before adding the liquids. The zinc oxide is employed for the purpose of reacting with a portion of the sulfonate thereby producing a better flocculating action on the powder when applied in aqueous suspension.

Example 4

The same as No. 1 except that denatured 95% ethyl alcohol is used instead of the isopropanol.

Example 5

The same as No. 1 except that water is used in place of the alcohol thus increasing the amount of water in the finished product to about 10%.

Example 6

The same as No. 1 except that water is used in place of alcohol and 200 parts of hard wall plaster is added to the tobacco before incorporation of the liquids.

In many instances when my tobacco powders are to be applied as suspensions in water it may be more convenient to add such nicotine sulfate as is necessary to satisfactorily augment the toxicity of the tobacco just prior to application. This may be done by adding the tobacco preparation to the nicotine solution in the spray tank before final dilution. It may also frequently be possible to employ tobacco of sufficiently high toxicity as to require no fortification. In either case a composition substantially as follows may be employed.

Example 7

| | Parts by weight |
|---|---|
| Sulfonic salts | 70 |
| Oil | 430 |
| Glacial acetic acid | 50 |
| Tobacco powder | 3000 |

The sulfonates and acid are incorporated in the oil and sprayed onto the moving tobacco powder as before.

For certain specific uses it may be desirable to increase the ratio of oil to nicotine or oil to total solids. Obviously this may be done either by increasing the proportion of oil in any of the foregoing examples or by adding a soluble or "miscible" oil composition, such as described in my copending applications Serial Numbers 733,251 and 6,391/35, in proper amount to the spray tank at the time of preparing the tobacco suspension.

While the preferentially oil soluble petroleum sulfonates have been indicated in the foregoing formulae I have found, as above mentioned, that water soluble sulfonates such as those described in my U. S. Patent #1,922,607 give similar reactions with nicotine and its products and when readily available may be preferable to the former even at the expense of an additional step in their incorporation since they are in general less apt to be phytocidal and give a better wetting action on some surfaces.

Example 8

| | Parts by weight |
|---|---|
| Nicotine sulfate solution (40% alkaloid) | 125 |
| Glacial acetic acid | 50 |
| Water | 300 |
| Water-soluble sulfonates (purified) | 110 |
| Spray oil #5 (100-110 viscosity @ 100° F.) | 450 |
| Tobacco powder | 3000 |
| Hard wall plaster | 400 |

The plaster is mixed with the tobacco powder. The sulfonic salt, acetic acid and nicotine solution are dissolved in the water and the oil dispersed therein. This loose emulsion may then be atomized into the moving powder, as before.

In general the manner or order of adding the the aqueous and oily liquids to the finely ground tobacco powder will be found to be more a matter of convenience and expediency in obtaining uniform and even distribution than of fundamental importance. Likewise the quantity of the finished product to be employed in any given spraying or dusting application will obviously be determined by the crop undergoing treatment and the nature and severity of the infestation to be controlled. In the examples chosen the object has been to give proportions of ingredients which will result in a final product that is substantially equally effective, pound for pound with lead arsenate as ordinarily employed. For instance, from 3 to 5 pounds of the described preparations in 100 gallons of water have been found to be well suited to the control of the codling moth on apples and pears.

While the aforementioned superior durability of the herein described preparations over hitherto known nicotine containing insecticides is undoubtedly in part due to the fact that they are maintained weakly acid at all times whereby dissipation of free nicotine is prevented, an explanation of the equal or superior toxicity of my compositions to those of the prior art is not so readily apparent and especially in view of the widely accepted belief that to be highly effective as insecticides nicotine preparations must be so constituted as to easily liberate the free alkaloid. It is my theory that the nicotine-sulfonic salts, previously described, which are present to a certain extent in the tobacco-sulfonate preparations of the present invention are inherently more toxic to insects than other known nicotine salts. It is also possible that certain constituents of the natural tobacco powder may still further augment or promote the toxicity of these particular nicotine combinations or even that the extreme fineness of the tobacco powders which I have employed has been responsible for the highly desirable results obtained.

Entirely aside from any hypothetical advantages which may be ascribed to the fine ground tobacco in my preparations certain desirable physical effects are clearly apparent from an inspection of these materials in operation. The film of extremely fine tobacco powder deposited uniformly on a slick glossy leaf surface materially aids in the retention of a more complete coverage of oil when such is applied therewith and resists, due to mere adsorption, a tendency to dry out and crack or peel off. The fact that the tobacco itself is appreciably hydroscopic adds still further to this desirable function so that the over-all effect is a film which by being continually replenished with moisture from rain or dew remains intact and hence provides good protection for relatively long periods of time. By reason of this same persistent film of moisture a vehicle for the water-soluble nicotine and/or nicotine sulfonate is provided at all times and may thus be responsible for effecting better contact with insects and also for keeping the toxic principle more readily available to them.

Having now described a new insecticidal tobacco-powder composition comprising petroleum sulfonic salts together with other incidental ingredients, what I claim is:

1. A horticultural insecticide comprising a finely ground tobacco powder, a petroleum sulfonic salt and a small amount of free acid.

2. A horticultural insecticide as in claim 1 wherein the acid is acetic acid.

3. A horticultural insecticide as in claim 1 wherein the acid is phosphoric acid.

4. A horticultural insecticide comprising finely ground tobacco powder the individual particles of which are intimately associated with a quantity, insufficient to cause agglomeration, of an oily menstruum consisting of a petroleum oil and a petroleum sulfonic salt.

5. The method of preparing a horticultural insecticide which consists in treating finely ground tobacco powder with petroleum sulfonic salts in atomized form while the tobacco powder is in motion.

6. A horticultural insecticide which comprises tobacco powder of great fineness having a nicotine content greater than about 2%, reckoned as free alkaloid, and being intimately associated with a slightly acid oily menstruum consisting of a petroleum oil, an alkali salt of sulfonic acids prepared from natural petroleum and acetic acid.

7. A horticultural insecticide which comprises tobacco powder of a fineness greater than about 200 mesh, having a nicotine content greater than about 2% reckoned as free alkaloid and intimately associated with a minor proportion of an alkali salt of sulfonic acids prepared from substantially unoxidized petroleum and a reaction product of said salt with zinc oxide.

WILLIAM HUNTER VOLCK.